United States Patent
Gao et al.

(10) Patent No.: US 10,560,270 B2
(45) Date of Patent: Feb. 11, 2020

(54) OPTIMAL DATA STORAGE CONFIGURATION IN A BLOCKCHAIN

(71) Applicant: International Business Machines Corporation, Armonk, NY (US)

(72) Inventors: Shan Gao, Beijing (CN); Xue F. Gao, Beijing (CN); Peng Han, Beijing (CN); Zhen Y. Shi, Beijing (CN); Qing F. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/585,365

(22) Filed: May 3, 2017

(65) Prior Publication Data
US 2018/0323974 A1  Nov. 8, 2018

(51) Int. Cl.
*H04L 9/32* (2006.01)

(52) U.S. Cl.
CPC .................. *H04L 9/3239* (2013.01)

(58) Field of Classification Search
CPC ..... H04L 9/3239; H04L 2209/38; H04L 9/32; H04L 9/0637; H04L 9/0643
See application file for complete search history.

(56) References Cited

U.S. PATENT DOCUMENTS

| 9,092,439 | B2 | 7/2015 | Gladwin et al. |
| 10,114,980 | B2* | 10/2018 | Barinov ............... G06F 21/645 |
| 2016/0269182 | A1 | 9/2016 | Sriram et al. |
| 2016/0283920 | A1* | 9/2016 | Fisher ................. H04L 9/3239 |
| 2018/0097779 | A1* | 4/2018 | Karame ............... G06Q 20/065 |
| 2018/0109541 | A1* | 4/2018 | Gleichauf ............ H04L 63/123 |
| 2018/0145836 | A1* | 5/2018 | Saur ..................... G06Q 20/3829 |
| 2018/0211043 | A1* | 7/2018 | Husain .................. G06F 21/64 |
| 2018/0241565 | A1* | 8/2018 | Paolini-Subramanya ................. H04L 9/3239 |
| 2018/0268504 | A1* | 9/2018 | Paolini-Subramanya ................. H04L 9/3236 |
| 2018/0276663 | A1* | 9/2018 | Arora ................. G06Q 20/3829 |
| 2019/0036702 | A1* | 1/2019 | Kano .................... G06F 16/182 |
| 2019/0073646 | A1* | 3/2019 | Wright ................. G06Q 20/065 |

FOREIGN PATENT DOCUMENTS

| CN | 105516203 A | 5/2016 |
| CN | 106326641 A | 8/2016 |

OTHER PUBLICATIONS

Tschorsch et al., "Bitcoin and Beyond: A Technical Survey on Decentralized Digital Currencies", 2016, IEEE Communications Surveys & Tutorials, vol. 18, No. 3, pp. 2084-2123. (Year: 2016).*

(Continued)

*Primary Examiner* — Matthew Smithers

(57) ABSTRACT

A blockchain of transactions may be referenced for various purposes and may be later accessed by interested parties for ledger verification and information retrieval. One example method of operation may include assigning one blockchain block to one group member node among a group of blockchain nodes, storing the one blockchain block in the one group member node, assigning a verification of the one blockchain block to one or more verification blockchain nodes which are part of the group of blockchain nodes, and storing the verification of the one blockchain block in each of the one or more verification blockchain nodes.

20 Claims, 7 Drawing Sheets

500

(56) References Cited

OTHER PUBLICATIONS

Zyskind et al., "Enigma: Decentralized Computation Platform with Guaranteed Privacy," arXiv preprint, arXiv:1506.03471 (2015).
Pazmiño et al., "Simply Dividing a Bitcoin Network Node may Reduce Transaction Verification Time," The SIJ Trans on Computer Networks & Communication Engineering (CNCE), v.3, n.2, Feb. 2015, pp. 17-21.

* cited by examiner

OPTIMAL DATA STORAGE CONFIGURATION IN A BLOCKCHAIN

TECHNICAL FIELD

This application generally relates to managing of transaction data storage in a ledger, and more particularly, to optimal data storage configuration in a blockchain.

BACKGROUND

The blockchain may be used as a public ledger to store any type of information. Although, primarily used for financial transactions, the blockchain can store any type of information including assets (i.e., products, packages, services, status, etc.). The blockchain may be used to securely store any type of information in its immutable ledger. Decentralized consensus is different from the traditional centralized consensus, such as when one central database used to rule transaction validity. A decentralized scheme transfers authority and trusts to a decentralized network and enables its nodes to continuously and sequentially record their transactions on a public "block," creating a unique "chain" referred to as the blockchain. Cryptography, via hash codes, is used to secure the authentication of the transaction source and removes the need for a central intermediary.

Blockchain's policy is to save all the block data on each of the nodes of the blockchain to ensure data consistency. Based on this policy, each node's maximize space for data utilization is limited and each node is required to store a large amount of data. In traditional blockchains, each node stores information for all of the blocks. With more transactions/blocks, tremendous storage is consumed on each node.

SUMMARY

One example embodiment may include a method of operation that may include one or more of assigning one blockchain block to one group member node among a group of blockchain nodes, storing the one blockchain block in the one group member node, assigning verification of the one or more blockchain data block to one or more verification blockchain nodes which are also part of the group of blockchain nodes, and storing the verification of the blockchain data block in each of the one or more verification blockchain nodes.

Another example embodiment may include an apparatus that includes a processor configured to perform one or more of assign one blockchain block to one group member node among a group of blockchain nodes, store the one blockchain block in the one group member node, assign a verification of the one blockchain block to one or more verification blockchain nodes which are also part of the group of blockchain nodes, and store the verification of the one blockchain block in each of the one or more verification blockchain nodes.

Still another example embodiment may include a non-transitory computer readable storage medium configured to store instructions that when executed cause a processor to perform one or more of assigning one blockchain block to one group member node among a group of blockchain nodes, storing the one blockchain block in the one group member node, assigning verification of the one or more blockchain data block to one or more verification blockchain nodes which are also part of the group of blockchain nodes, and storing the verification of the blockchain data block in each of the one or more verification blockchain nodes.

DETAILED DESCRIPTION

Figure 1:
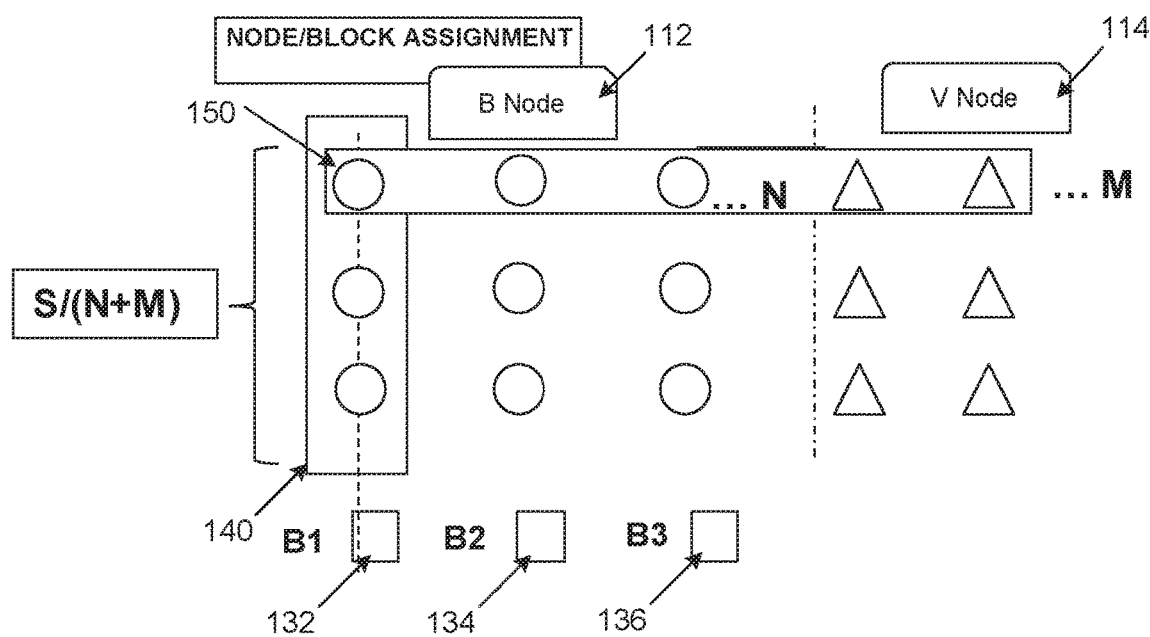
FIG. 1 illustrates a node/block assignment configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to managing of transaction data storage in a trust ledger, and in another embodiment relates to distributing the transaction data across multiple nodes in the blockchain in an optimal distributed data configuration.

Example embodiments provide configurations to store blockchain data fragmentally among peer nodes of the blockchain instead of saving a full copy on each node. In one example, each block of the blockchain will have more than one copy stored on more than one node for redundancy, however, not all nodes will have all blocks. Also, a group is created for certain data blocks with additional verification blocks based on a rule, such as a linear equation. Both verification blocks and data blocks are stored randomly to assure data security.

Block data can be classified as two types, one is the original data block which is stored in block nodes ('B' nodes), the other is the verification block which is stored in verification nodes ('V' nodes). In a group, an integer 'N' is defined as the number of data block nodes ('B' nodes) in a group each having more than one node. M represents the number of verification nodes ('V' nodes) in a group. The total nodes 'S' is divided by (N+M), so the group count is S/(N+M). For a group 'B' node, each blockchain 'B' node in one group will store data blocks. For a group 'V' node, each block chain 'V' node in one group will store a checksum for all 'B' nodes in a same group. The number of group V nodes depends on a data integrity/restore requirement level. By using linear encoding, the 'N' original block data generates 'M' verification blocks. The blocks B1, B2, ... Bn are each assigned to one node in a group. The verification nodes V1, V2 ... VM store the verification block data computed by linear encoding of the blocks.

FIG. 1 illustrates a node/block assignment configuration according to example embodiments. Referring to FIG. 1, the configuration 100 includes various nodes indicated by the circles as 'B' nodes 112 and the triangles as 'V' nodes 114. The group example 150 includes a set of 'B' nodes and 'V' nodes. The blocks 132, 134 and 136 represent individual blocks which must be assigned to the blocks of each group. All nodes (S) are distributed into different groups and each group contains N block nodes and M verification nodes. The nodes' distribution is not fixed and is preferably is redistributed each cycle. In a cycle, each of the N block nodes has a single block data, and each of M verification nodes has a single verification data as well. For each group, after N block data is recorded into the N 'B' nodes, the current cycle ends and a next cycle begins. A group contains N block nodes (B nodes) and M verification nodes (V node).

All the nodes are distributed into different groups, but due to security considerations, this grouping is not fixed. As such, the nodes would be re-grouped after the current cycle ends. In a cycle, each of N data block nodes could have only one block data, after each of N consecutive blocks are individually distributed into one of N block nodes. In turn, each of all the N block nodes has 1 data block, and the nodes are re-grouped. Same as block nodes, each of the verification nodes also has one verification block in a cycle, and is also re-grouped after a cycle. In addition, a node may act as a block node in a cycle, which also could be a verification node in another cycle. Since a node is not consistently fixed in a same group, this assignment would advance a security level. Since each group contains (N+M) nodes (N block nodes and M verification nodes), for a total of 'S' nodes, then there would be S/(N+M) groups identified by the vertical rectangle 140. The first nodes in each group are all assigned block 1 (B1), these 2nd nodes in each group are assigned block 2 (B2) and the Nth nodes are identified by block N.

A linear encoder may be used to provide an N×M metric to multiply the N block data {B1, B2 ... Bn}, where each of the blocks B are represented as a column vector. Also, an M verification block data may be generated {V1, V2, ... Vm}. In the event that any of the M+N block data are missing or corrupted, the missing data could be retrieved from the remaining block data by using linear decoding including original and verification block data. In a cycle block nodes are used to write a real data block and verification nodes are used for verification purposes. Besides data in B nodes, verification in V nodes is also written as a block. The data in B nodes can be seen as the real data. Verification blocks in V nodes are the calculated blocks derived from data blocks.

Figure 2:
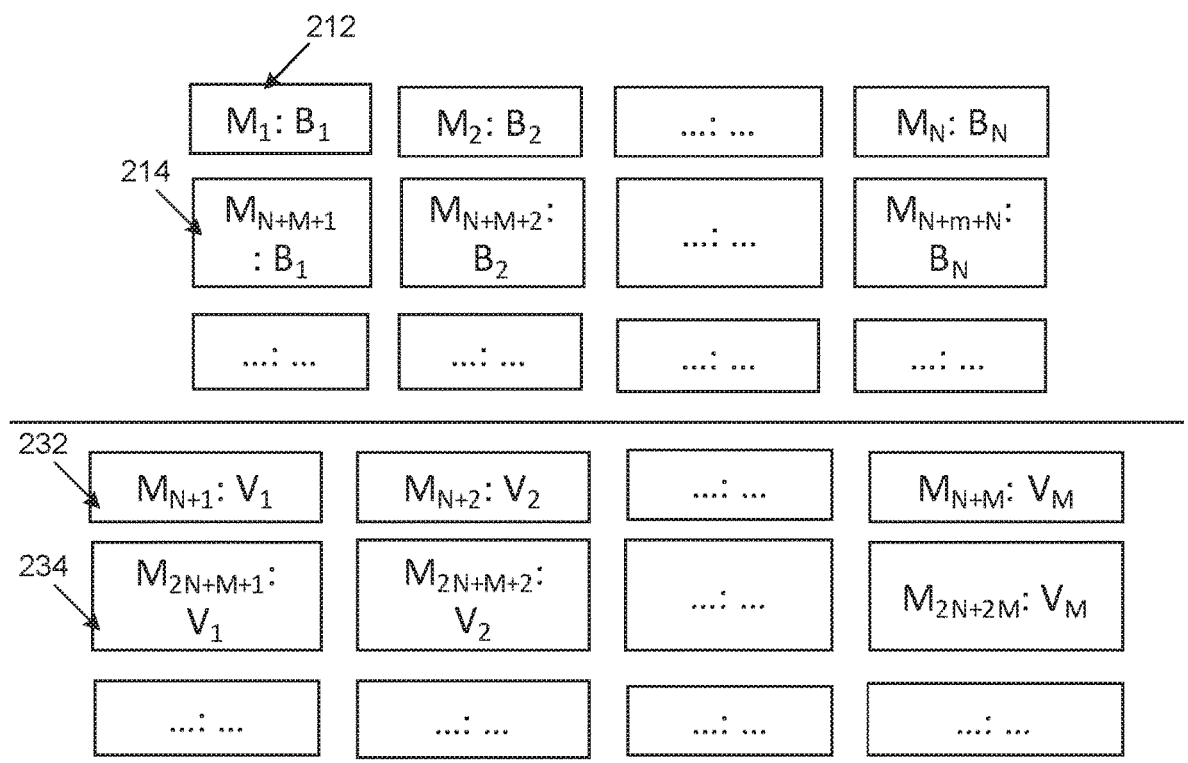
FIG. 2 illustrates a block group assignment configuration according to example embodiments.

FIG. 2 illustrates a block group assignment configuration according to example embodiments. Referring to FIG. 2, the configuration 200 includes a cycle which contains N consecutive blocks. Prior to each cycle, all of the (S) nodes are randomly placed into a S/(N+M) group. Within each group, each block is only written into one node. Same block data is written into nodes with same positions across other groups. For example, in a cycle, nodes from '1' 212 to N+M are assigned to group '1', nodes from N+M+1 214 to 2N+2M are assigned to group '2', etc. Node '1' and N+M+1 214 have the same block '1' data, and node '2' and N+M+2 have the same block '2' data. The verification nodes store verifications corresponding to the blocks of the 'B' nodes in a same group. For example, verification nodes N+1 232 and 2N+M+1 234 correspond to similar nodes of the verification in the respective node groups. However, this random grouping assignment procedure is not fixed and could vary in a next cycle.

Figure 3:
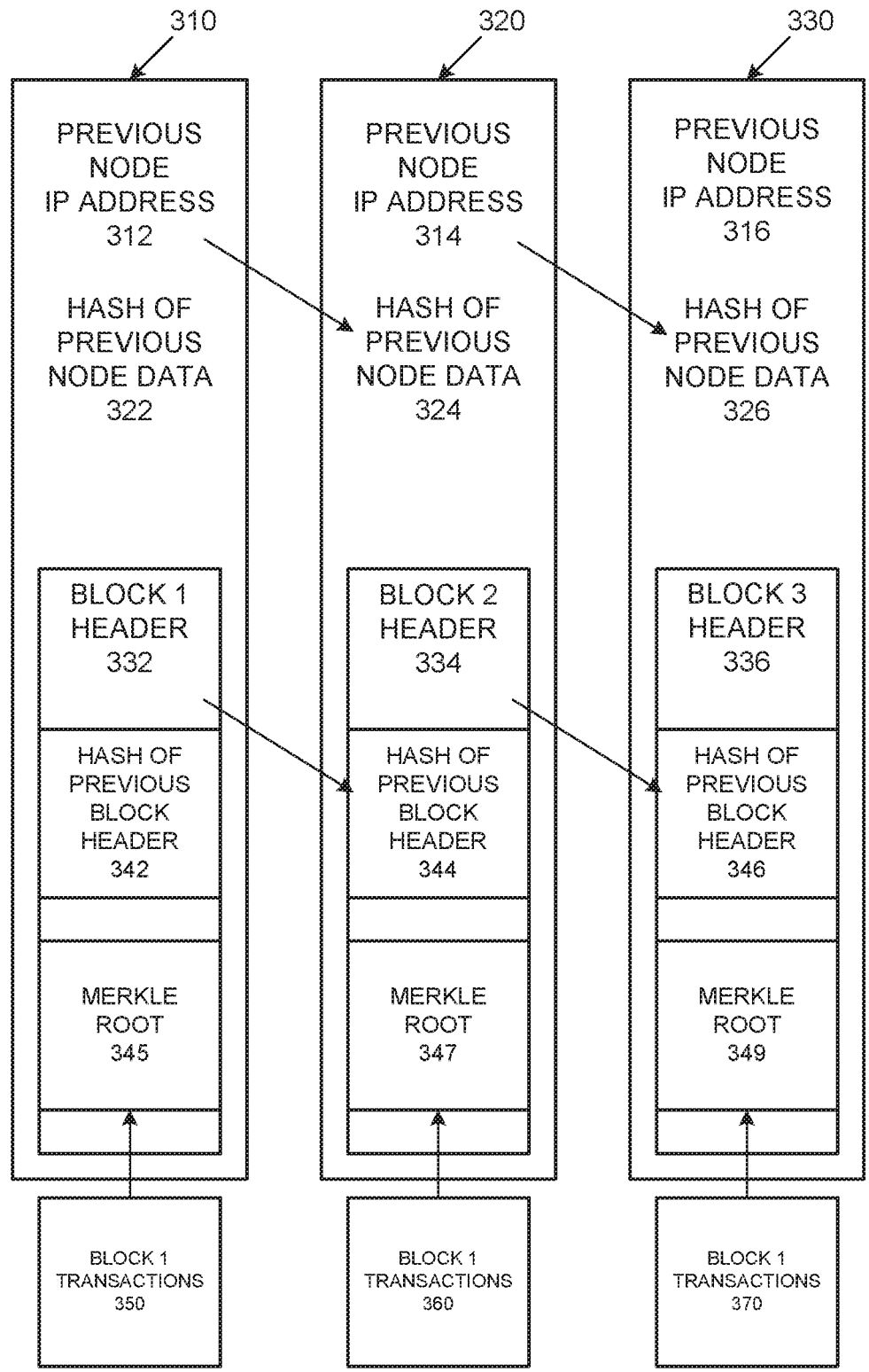
FIG. 3 illustrates a node group setup configuration according to example embodiments.

FIG. 3 illustrates a block setup configuration according to example embodiments. Within a cycle, the M+N blocks are individually distributed in M+N nodes. Besides the original hash for the raw block data, three additional data fields may be added including a flag to denote the block is a data or verification block, a prior node IP address, and/or a hash of all the above data (e.g., original block data, prior node IP address, flag, etc.). Referring to FIG. 3, the example block configurations 300 include examples of data for each block 310, 320, and 330. Included in this approach to storing blockchain block data, a previous node IP addresses 312, 314 and 316 are assigned to a next node along with a hash of the previous data 322, 324 and 326. The block 1 header 332 and the hash of the previous block header 342 are part of the current block 310. Similarly, the next blocks 320 and 330 store the block 2 and 3 headers 334 and 336, and the hashes of the previous blocks 344 and 346. Each block also has its own Merkle root 345, 347 and 349 and block transactions 350, 360 and 370. In a blockchain with S data blocks, for example, if every N data blocks has M verification blocks, compared to traditional blockchain, the storage saving percent approaches the expression (S-S/N)/S.

The blocks 310, 320 and 330 are the whole structures of data blocks. A block would include a flag used to denote this block is a data block or verification block, a prior node IP address (e.g. for a cycle), for example, the block in the 3rd node has the 2nd node's IP in a group, and the block in the 2nd node has the 1st node IP, and the 1st block stores the last node's IP of a previous cycle, and a hash of the prior block in the prior node (e.g. for a cycle), for example, the block in the 3rd node has the hashed value of the 2nd block in the 2nd node in a same group. Also, the block in the first node would have the hashed value of the last block data in a previous cycle that could be searched by its prior node IP address. Further, the block would have the original traditional block data for B nodes. For V nodes, this part is the calculated verification data.

Figure 4:
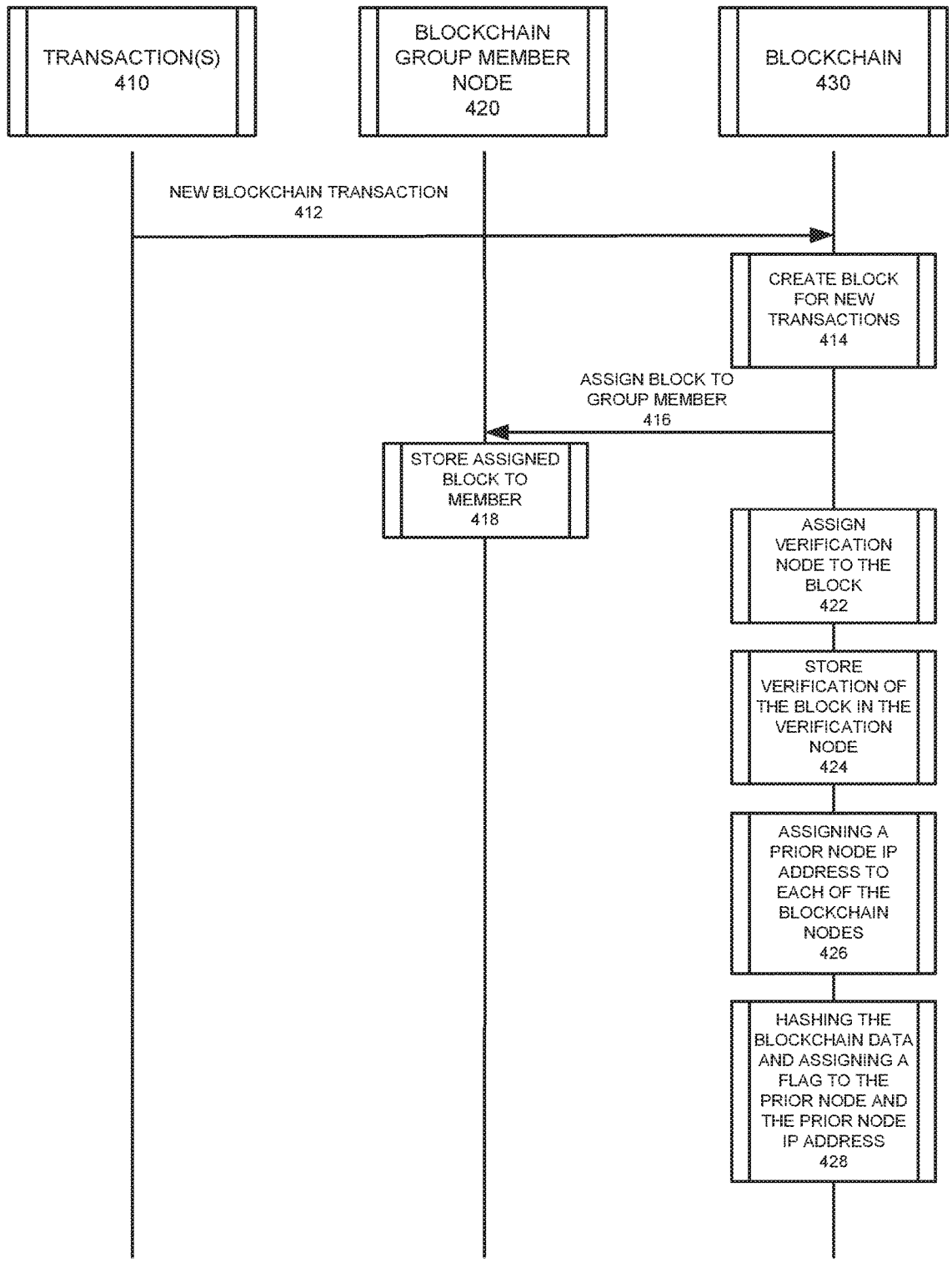
FIG. 4 illustrates a system signaling diagram of the interactions between new transactions, certain member nodes and a blockchain according to example embodiments.

FIG. 4 illustrates a system signaling diagram of the interactions between new transactions, certain member nodes and a blockchain according to example embodiments. Referring to FIG. 4, the system configuration 400 includes transactions 410 being processed by the blockchain 430 to create blocks and assign group member nodes 420. In this example, when new blockchain transactions 412 are received, the new blocks are created, in turn, 414 and are assigned 416 to certain ones of the blockchain nodes to be stored at those selected group nodes 418. One example may include 10 groups of N nodes, where the block #1 is assigned to node #1 of each of the 10 groups and no other nodes from the group of N nodes. The blockchain 430 may be part of a system or virtual computer that manages assignment of blocks to members. The verification node is assigned 422 as part of the group to store the verification information for each block 424. Other data included may include a prior node IP address of a previous node 426. The data may be hashed and assigned a flag along with prior address information to include in the block data 428. Each of the elements 410, 420, 430 may be a device comprising a processor and memory or may be functionality performed by a device that comprises a processor and memory.

Figure 5A:
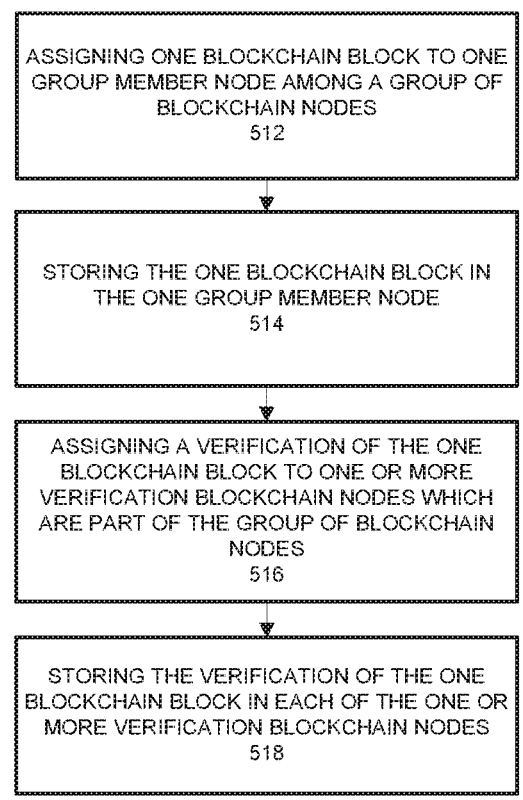
FIG. 5A illustrates a flow diagram of an example of a storage configuration in a blockchain according to example embodiments.

FIG. 5A illustrates a flow diagram 500 of an example of a storage configuration in a blockchain according to example embodiments. One or more of the following may occur: assigning one blockchain block to one group member node among a group of blockchain nodes 512, storing the one blockchain block in the one group member node 514, assigning a verification of the one blockchain block to one or more verification blockchain nodes which are also part of the group of blockchain nodes 516, and storing the verification of the one blockchain block in each of the one or more verification blockchain nodes 518. The one blockchain block may include original blockchain transaction data. The verification includes a checksum of the original blockchain transaction data. In this example, the one block is assigned to a plurality of different group members each assigned to a respective plurality of different groups, wherein none of the plurality of different group members are members of the same group. The plurality of different group members each have a same respective assigned position within the respective plurality of different groups. The method may also include assigning a flag to each of the block nodes and the verification nodes, such that the flag for the block nodes is different from the flag for the verification nodes. The method may also include assigning a prior node IP address to each of the block nodes and the verification nodes, and hashing the prior blockchain block, a flag assigned to a prior node and the prior node IP address.

Figure 5B:
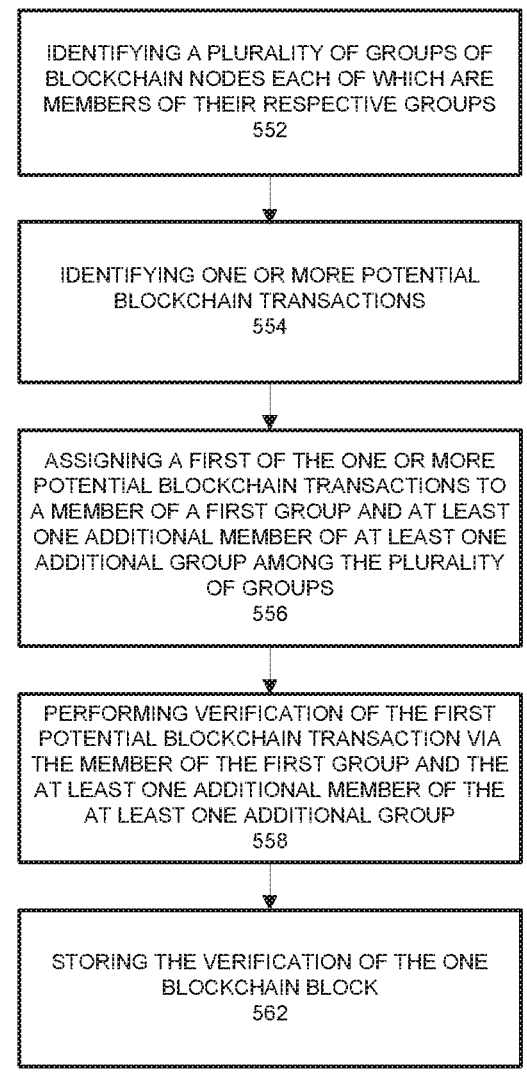
FIG. 5B illustrates another flow diagram of an example of storage configuration in a blockchain according to example embodiments.

FIG. 5B illustrates another flow diagram 550 of an example of a storage configuration in a blockchain according to example embodiments. One or more of the following may occur: identifying a plurality of groups of blockchain nodes each of which are members of their respective groups 552, identifying one or more potential blockchain transactions 554, assigning a first of the one or more potential blockchain transactions to a member of a first group and at least one additional member of at least one additional group among the plurality of groups 556, and performing verification of the first potential blockchain transaction via the member of the first group and the at least one additional member of the at least one additional group 558, and then storing the verification of the one blockchain block 562. In this example, once the groups are established, the members may also be assigned to verify transactions in a manner that provides verification from one member of a particular group and another member of at least one additional group. The groups may be created to include members which are not in the same location and unbiased and thus may provide proper authentication and authorization of blockchain transactions prior to commitment to the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent or be integrated in any of the above-described components, etc.

Figure 6:
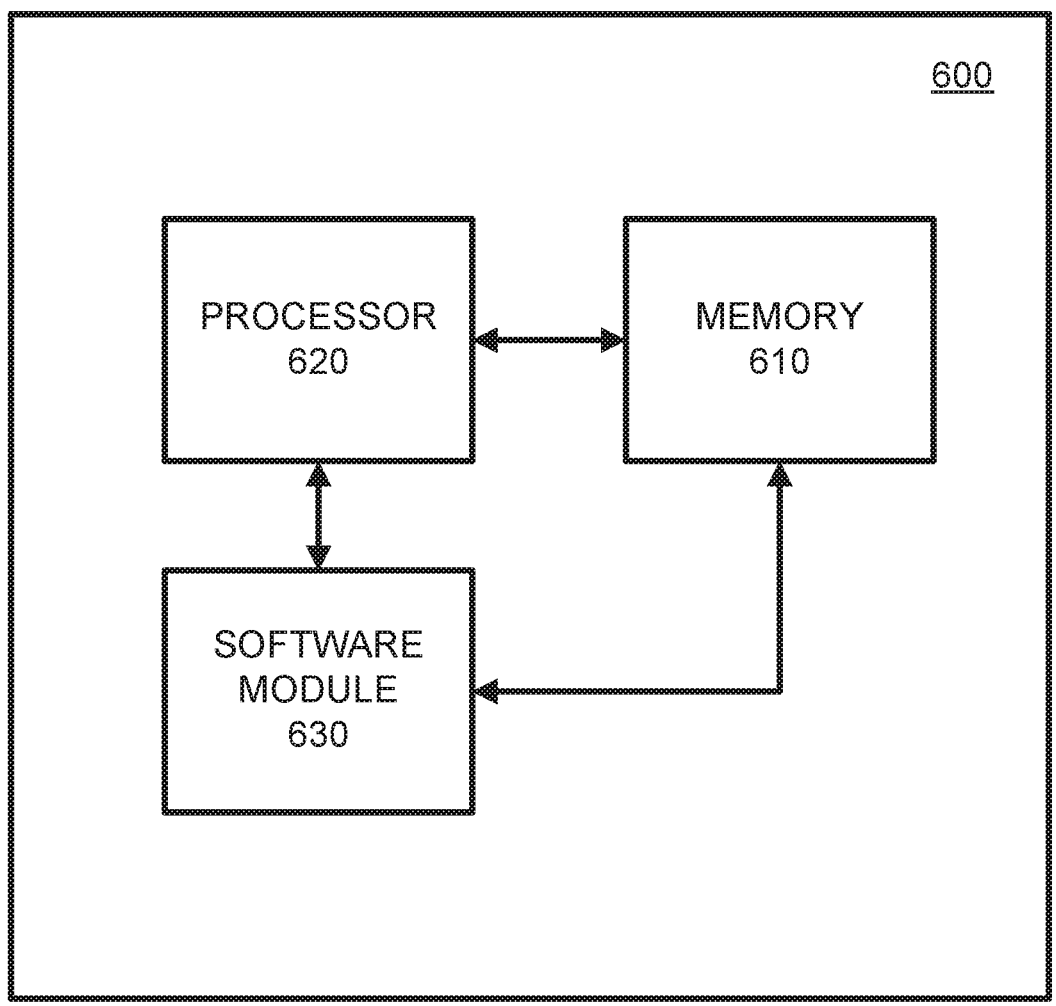
FIG. 6 illustrates an example network entity configured to support one or more of the example embodiments.

As illustrated in FIG. 6, a memory 610 and a processor 620 may be discrete components of a network entity 600 that are used to execute an application or set of operations as described herein. The application may be coded in software in a computer language understood by the processor 620, and stored in a computer readable medium, such as, a memory 610. The computer readable medium may be a non-transitory computer readable medium that includes tangible hardware components, such as memory, that can store software. Furthermore, a software module 630 may be another discrete entity that is part of the network entity 600, and which contains software instructions that may be executed by the processor 620 to effectuate one or more of the functions described herein. In addition to the above noted components of the network entity 600, the network entity 600 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   assigning one blockchain block to a group member node among a group of member nodes of a blockchain;
   storing the one blockchain block in the assigned group member node and not storing the blockchain block in one or more non-assigned group member nodes;
   assigning a verification of the one blockchain block to one or more verification blockchain nodes which are part of the one or more non-assigned group member nodes; and
   storing the verification of the one blockchain block in each of the one or more verification blockchain nodes.

2. The method of claim 1, wherein the one blockchain block comprise original blockchain transaction data.

3. The method of claim 1, wherein the verification comprises a checksum of the original blockchain transaction data.

4. The method of claim 1, further comprising:
   assigning the one block to a plurality of different group members each assigned to a respective plurality of different groups, wherein none of the plurality of different group members are members of the same group.

5. The method of claim 4, wherein the plurality of different group members each have a same respective assigned position within the respective plurality of different groups.

6. The method of claim 1, further comprising:
   assigning a flag to each of the blockchain nodes and the verification blockchain nodes, wherein the flag for the blockchain nodes is different from the flag for the verification blockchain nodes.

7. The method of claim 6, further comprising:
   assigning a prior node IP address to each of the blockchain nodes and the verification blockchain nodes; and
   hashing blockchain data of the blockchain block, a flag assigned to a prior node and the prior node IP address.

8. An apparatus, comprising:
   a processor configured to:
   assign one blockchain block to a group member node among a group of member nodes of a blockchain;
   store the one blockchain block in the assigned group member node and not store the blockchain block in one or more non-assigned group member nodes;
   assign a verification of the one blockchain block to one or more verification blockchain nodes which are part of the one or more non-assigned group member nodes; and
   store the verification of the one blockchain block in each of the one or more verification blockchain nodes.

9. The apparatus of claim 8, wherein the one blockchain block comprises original blockchain transaction data.

10. The apparatus of claim 8, wherein the verification comprises a checksum of the original blockchain transaction data.

11. The apparatus of claim 8, wherein the processor is further configured to: assign the one block to a plurality of different group members each assigned to a respective plurality of different groups, wherein none of the plurality of different group members are members of the same group.

12. The apparatus of claim 11, wherein the plurality of different group members each have a same respective assigned position within the respective plurality of different groups.

13. The apparatus of claim 8, wherein the processor is further configured to: assign a flag to each of the blockchain nodes and the verification blockchain nodes, wherein the flag for the blockchain nodes is different from the flag for the verification blockchain nodes.

14. The apparatus of claim 13, wherein the processor is further configured to:
assign a prior node IP address to each of the blockchain nodes and the verification blockchain nodes; and
hash blockchain data of the blockchain block, a flag assigned to a prior node and the prior node IP address.

15. A non-transitory computer readable storage medium configured to store instructions that when executed cause a processor to perform:
assigning one blockchain block to group member node among a group of member nodes of a blockchain;
storing the one blockchain block in the assigned group member node and not storing the blockchain block in one or more non-assigned group member nodes;
assigning a verification of the one blockchain block to one or more verification blockchain nodes which are part of the one or more non-assigned group member nodes; and
storing the verification of the one blockchain block in each of the one or more verification blockchain nodes.

16. The non-transitory computer readable storage medium of claim 15, wherein the one blockchain block comprise original blockchain transaction data.

17. The non-transitory computer readable storage medium of claim 15, wherein the verification comprises a checksum of the original blockchain transaction data.

18. The non-transitory computer readable storage medium of claim 15, wherein the processor is further configured to perform:
assigning the one block to a plurality of different group members each assigned to a respective plurality of different groups, wherein none of the plurality of different group members are members of the same group.

19. The non-transitory computer readable storage medium of claim 18, wherein the plurality of different group members each have a same respective assigned position within the respective plurality of different groups.

20. The non-transitory computer readable storage medium of claim 15, wherein the processor is further configured to perform:
assigning a flag to each of the blockchain nodes and the verification blockchain nodes, wherein the flag for the blockchain nodes is different from the flag for the verification blockchain nodes;
assigning a prior node IP address to each of the blockchain nodes and the verification blockchain nodes; and
hashing blockchain data of the blockchain block, a flag assigned to a prior node and the prior node IP address.

* * * * *